(12) United States Patent
Wolfe (10) Patent No.: US 9,915,994 B2
(45) Date of Patent: Mar. 13, 2018

(54) POWER MANAGEMENT FOR PROCESSOR

(71) Applicant: EMPIRE TECHNOLOGY DEVELOPMENT LLC, Wilmington, DE (US)

(72) Inventor: Andrew Wolfe, Los Gatos, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 92 days.

(21) Appl. No.: 14/281,899

(22) Filed: May 20, 2014

(65) Prior Publication Data

US 2014/0258752 A1  Sep. 11, 2014

Related U.S. Application Data

(63) Continuation of application No. 12/551,550, filed on Aug. 31, 2009, now Pat. No. 8,738,949.

(51) Int. Cl.
*G06F 1/32* (2006.01)
*G06F 1/20* (2006.01)

(52) U.S. Cl.
CPC ............ *G06F 1/3206* (2013.01); *G06F 1/206* (2013.01); *G06F 1/3203* (2013.01); *G06F 1/324* (2013.01);
(Continued)

(58) Field of Classification Search
CPC ........ G06F 1/3206; G06F 1/324; G06F 1/206; G06F 1/3296; G06F 1/3203; Y02B 60/1285; Y02B 60/1217; Y02B 60/1275
See application file for complete search history.

(56) References Cited

U.S. PATENT DOCUMENTS 5,451,892 A * 9/1995 Bailey .................... G06F 1/206 327/113
6,336,080 B1 * 1/2002 Atkinson ................ G06F 1/206 702/132
(Continued)

FOREIGN PATENT DOCUMENTS

JP  2005533296 A  11/2005
JP  2006515448 A   5/2006
(Continued)

OTHER PUBLICATIONS

Notification of Transmittal of the International Search Report and the Written Opinion of the International Searching Authority, International Application No. PCT/US10/38062, dated Sep. 16, 2010.
(Continued)

*Primary Examiner* — Jaweed A Abbaszadeh
*Assistant Examiner* — Brian J Corcoran
(74) *Attorney, Agent, or Firm* — Turk IP Law, LLC (57) ABSTRACT

Techniques are generally described related to management of power consumption for a processor. One example method may include identifying a target operating constraint and a first operating parameter; determining a second operating parameter based on the target operating constraint and the first operating parameter; estimating an actual operating constraint; comparing the target operating constraint and the actual operating constraint; and setting up the first operating parameter and the second operating parameter of the processor based on a comparison of the target operating constraint and the actual operating constraint, wherein the target operating constraint is not a worst-case operating constraint. Other examples of methods, systems, and computer programs related to managing power consumption for a processor are also contemplated.

19 Claims, 5 Drawing Sheets

(52) U.S. Cl.
CPC ........ *G06F 1/3296* (2013.01); *Y02B 60/1217* (2013.01); *Y02B 60/1275* (2013.01); *Y02B 60/1285* (2013.01)

(56) References Cited

U.S. PATENT DOCUMENTS

| | | |
|---|---|---|
| 6,442,700 B1 | 8/2002 | Cooper |
| 6,457,135 B1 | 9/2002 | Cooper |
| 6,836,849 B2 | 12/2004 | Brock et al. |
| 7,036,030 B1 | 4/2006 | Altmejd |
| 7,111,178 B2 | 9/2006 | Rusu et al. |
| 7,188,261 B1 | 3/2007 | Tobias et al. |
| 7,336,090 B1 | 2/2008 | Koniaris et al. |
| 7,362,165 B1 | 4/2008 | Chen |
| 7,376,849 B2* | 5/2008 | Tschanz ............... G06F 1/206 713/300 |
| 7,506,190 B2 | 3/2009 | Thomas et al. |
| 7,562,233 B1* | 7/2009 | Sheng ............... G06F 1/3203 327/534 |
| 7,602,166 B1 | 10/2009 | Kang |
| 7,774,625 B1 | 8/2010 | Sheng et al. |
| 7,849,332 B1 | 12/2010 | Alben et al. |
| 7,886,167 B2* | 2/2011 | Burton ............... G06F 1/206 365/222 |
| 7,917,772 B1 | 3/2011 | Koniaris et al. |
| 7,953,990 B2 | 5/2011 | Stewart et al. |
| 8,020,038 B2 | 9/2011 | Riedlinger et al. |
| 8,127,160 B2 | 2/2012 | Bieswanger et al. |
| 2003/0109967 A1* | 6/2003 | Cooper ............... G06F 1/206 700/299 |
| 2003/0115013 A1 | 6/2003 | Dendinger |
| 2004/0025061 A1 | 2/2004 | Lawrence |
| 2004/0071184 A1* | 4/2004 | Naveh ............... G06F 1/3203 374/42 |
| 2004/0128101 A1 | 7/2004 | Hermerding, II |
| 2004/0128566 A1 | 7/2004 | Burr et al. |
| 2005/0188230 A1* | 8/2005 | Bilak ............... G06F 1/3203 713/300 |
| 2006/0218428 A1* | 9/2006 | Hurd ............... G06F 1/10 713/500 |
| 2007/0050650 A1 | 3/2007 | Conroy et al. |
| 2007/0052453 A1* | 3/2007 | Wald ............... G06F 1/206 327/100 |
| 2007/0074011 A1* | 3/2007 | Borkar ............... G06F 1/3203 712/227 |
| 2007/0130485 A1* | 6/2007 | Narendra ............... G06F 1/206 713/320 |
| 2007/0156370 A1 | 7/2007 | White et al. |
| 2007/0250729 A1 | 10/2007 | Thomas et al. |
| 2008/0022140 A1 | 1/2008 | Yamada et al. |
| 2009/0037712 A1* | 2/2009 | Mallik ............... G06F 1/3203 713/1 |
| 2009/0224601 A1 | 9/2009 | Ito |
| 2010/0169585 A1* | 7/2010 | Steinbrecher ............ G11C 7/04 711/154 |

FOREIGN PATENT DOCUMENTS

| | | |
|---|---|---|
| JP | 2007299346 A | 11/2007 |
| JP | 2009522688 A | 6/2009 |

OTHER PUBLICATIONS

Jinfeng Liu et al., "A Constraint-based Application Model and Scheduling Techniques for Power-aware Systems", ACM, Proceedings of the ninth international symposium on Hardware/software codesign, 2001, pp. 153-158.

Almir Mutapcic et al., "Processor Speed Control With Thermal Constraints," IEEE Transactions on Circuits and Systems I: Regular Papers, Sep. 2009, pp. 1994-2008, vol. 56, No. 9.

Bing Shi et al., "Unified Datacenter Power Management Considering On-Chip and Air Temperature Constraints," Sustainable Computing: Informatics and Systems, 2010, pp. 91-98, vol. 1, No. 2.

"Stringent", Merriam Webster, Retrieved from the <URL: http://web.archive.org/web/20100220174049/http://www.merriam-webster.com/dictionary/stringent> on Aug. 27, 2014, pp. 2.

* cited by examiner

400 A computer program product 402 at least one of one or more instructions for identifying a target operating constraint and a first operating parameter;

one or more instructions for determining a second operating parameter based on the target operating constraint and the first operating parameter;

one or more instructions for estimating an actual operating constraint;

one or more instructions for comparing the target operating constraint and the actual operating constraint; or one or more instructions for setting up the first operating parameter and the second operating parameter of the processor based on a comparison of the target operating constraint and the actual operating constraint, wherein the target operating constraint is not a worst-case operating constraint 404 a signal bearing medium 406 a communication medium 408 a computer readable medium 410 a recordable medium

POWER MANAGEMENT FOR PROCESSOR

CROSS-REFERENCE TO RELATED APPLICATION

This application is a continuation application under 35 U.S.C. § 120 of U.S. patent application Ser. No. 12/551,550, filed on Aug. 31, 2009, now U.S. Pat. No. 8,738,949, which is incorporated herein by reference.

BACKGROUND

Unless otherwise indicated herein, the approaches described in this section are not prior art to the claims in this application and are not admitted to be prior art by inclusion in this section.

Power management of a processor may be achieved by switching various operating parameters of the processor. Example operating parameters may include, without limitation, the core voltage of the processor and the clock rate of the processor. A set of predefined operating constraints may be used to characterize a worst-case operating condition for the processor in which all operating constraints are within a designed specification, but at the worst possible values. An example predefined operating constraint may include the worst-case junction temperature at which the processor can operate properly based on the design of the processor. Once the worst-case operating condition for the processor is characterized, the operating parameters for the processor can be changed to limit power consumption of the processor.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings. The same numerals used in different drawings may represent the same embodiments of the present disclosure.

In the drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, systems, and computer programs related to managing power consumption for a processor.

In this disclosure, the term "operating point" for a processor may generally refer to a point at which the processor may reliably be operated, and the term "operational profile" may generally refer to a set of these operating points. The term "operating parameter" may generally refer to a parameter used to characterize an aspect of an operational profile. The term "target operating constraint" may generally refer to a predefined operating constraint. The term "actual operating constraint" may generally refer to a measured/calculated operating constraint at which the processor is operating. The term "worst-case operating constraint" may generally refer to a predefined operating constraint used to characterize a worst-operating condition of a processor. The term "core voltage" may generally refer to a voltage supplied by a power supply to a processor.

An operational profile may be defined based on a set of operating parameters and a target operating constraint. The operating parameters may include, without limitation, the core voltage of the processor, the clock rate of the processor, the clock multiplier for the processor, power throttling for the processor, sleep state cycle for the processor, and so on. The target operating constraint may include, without limitation, a target junction temperature of the processor, a target ground noise, a target clock jitter and so on. To manage the power consumption of a processor, the processor may be configured to operate in different operational profiles depending on its workload.

Some techniques for defining an operating point based on a worst-case operating constraint are known in the art. Although these techniques may be known, the present disclosure recognizes that the defining of an operating point may depend on a target operating constraint that may not be a worst-case operating constraint. Example techniques may include simulation based on a model. For example, the simulation may include fixing a target operating constraint and a first operating parameter and varying a second operating parameter until the model fails to determine an operating point.

After having determined the operating parameters, the processor may then be configured to switch among various operational profiles based on an actual operating constraint. In some implementations, the actual operating constraint may be an actual operating junction temperature of the processor.

Figure 1:
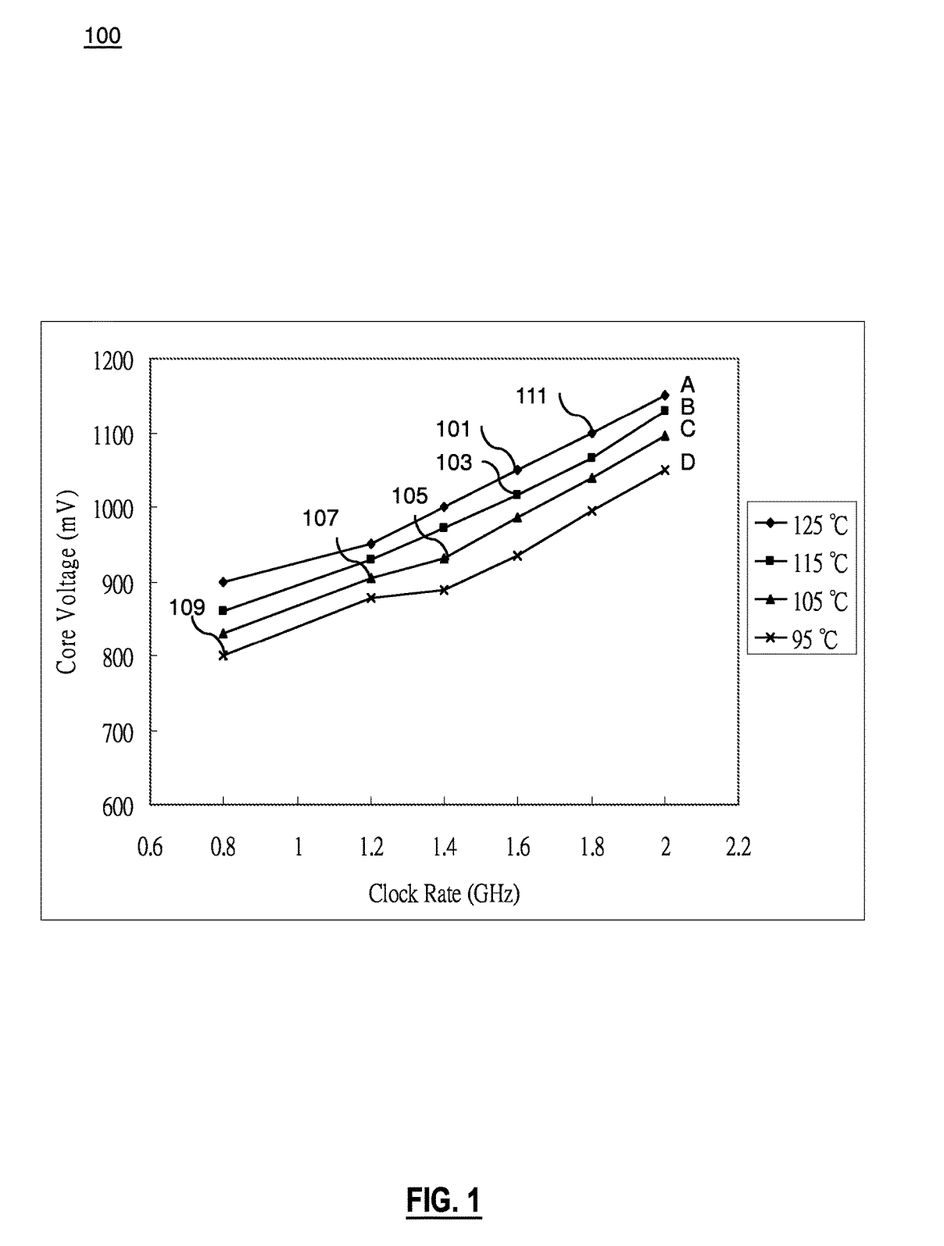
FIG. 1 is a scatter chart illustrating a set of operating points of a processor.

FIG. 1 is a scatter chart 100 illustrating a set of operating points of a processor that is arranged in accordance with at least some embodiments of the present disclosure. Curves A, B, C, and D are associated with four different target operating constraints, respectively. For example, the target operating constraint may be a target junction temperature, and curve A may be associated with a first target junction temperature (e.g., 125° C.). Similarly, the curves B, C, and D may be associated with a second target junction temperature (e.g., 115° C.), a third target junction temperature (e.g., 105° C.), and a fourth target junction temperature of (e.g., 95° C.), respectively. With the first target junction temperature, a set of operating points may be determined based on the first target junction temperature and a set of operating parameters. In some implementations, the operating parameters may include, without limitation, a core voltage of the processor and a clock rate of the processor. Each one of the operating points (e.g., point 101 and point 111) on curve A may be defined by the first target junction temperature, the core voltage of the processor, and the clock rate of the processor. Similarly, each of the operating points on the other curves (e.g., point 103 on curve B, points 105 and 107 on curve C, and point 109 on curve D) may be defined by a core voltage of the processor, a clock rate of the processor, and the target junction temperatures of the processor associated with the curves.

To illustrate, suppose the processor operates at a first operating point 101. At the first operational point 101, the processor may be configured to operate at a first core voltage and a first clock rate. When the actual operating junction temperature of the processor is determined (e.g., measured) to be significantly lower than the first target junction temperature, continuing to operate the processor in the operational profiles defined by curve A may result in unnecessary power consumption by the processor. The actual operating junction temperature may be measured by a temperature sensor or may be calculated based on some known operating parameters and models.

To manage power consumption, the actual junction temperature may be a factor that is considered in adaptively switching the processor from operating in one operational profile to another. In some implementations, when the actual junction temperature is between the first target junction temperature and the second target junction temperature, the processor may be configured to operate in any of the operating points corresponding to curve A. When the actual junction temperature is between the second target junction temperature and the third target junction temperature, the processor may be configured to operate in any of the operating points corresponding to curve A and curve B.

In some implementations, when the processor is switched from the first operating point 101 to a second operating point 103, the processor may be configured to be operated at a second core voltage and a second clock rate. The first clock rate may be higher than the second clock rate, and the first core voltage may be higher than the second core voltage. In other words, by switching from the first operating point 101 to the second operating point 103, the first clock rate may be reduced to the second clock rate. Once the clock rate stabilizes, the first core voltage may then be reduced to the second core voltage. On the other hand, to switch from the second operating point 103 back to the first operating point 101, the second core voltage may be raised back to the first core voltage. Once the core voltage stabilizes, the second clock rate may then be raised back to the first clock rate.

In some implementations, the operating parameters and the target operating constraints characterizing each operational point may be stored in a memory adjacent to the processor. For efficiency, the number of the stored operating parameters for the operational environments may be reduced.

Figure 2:
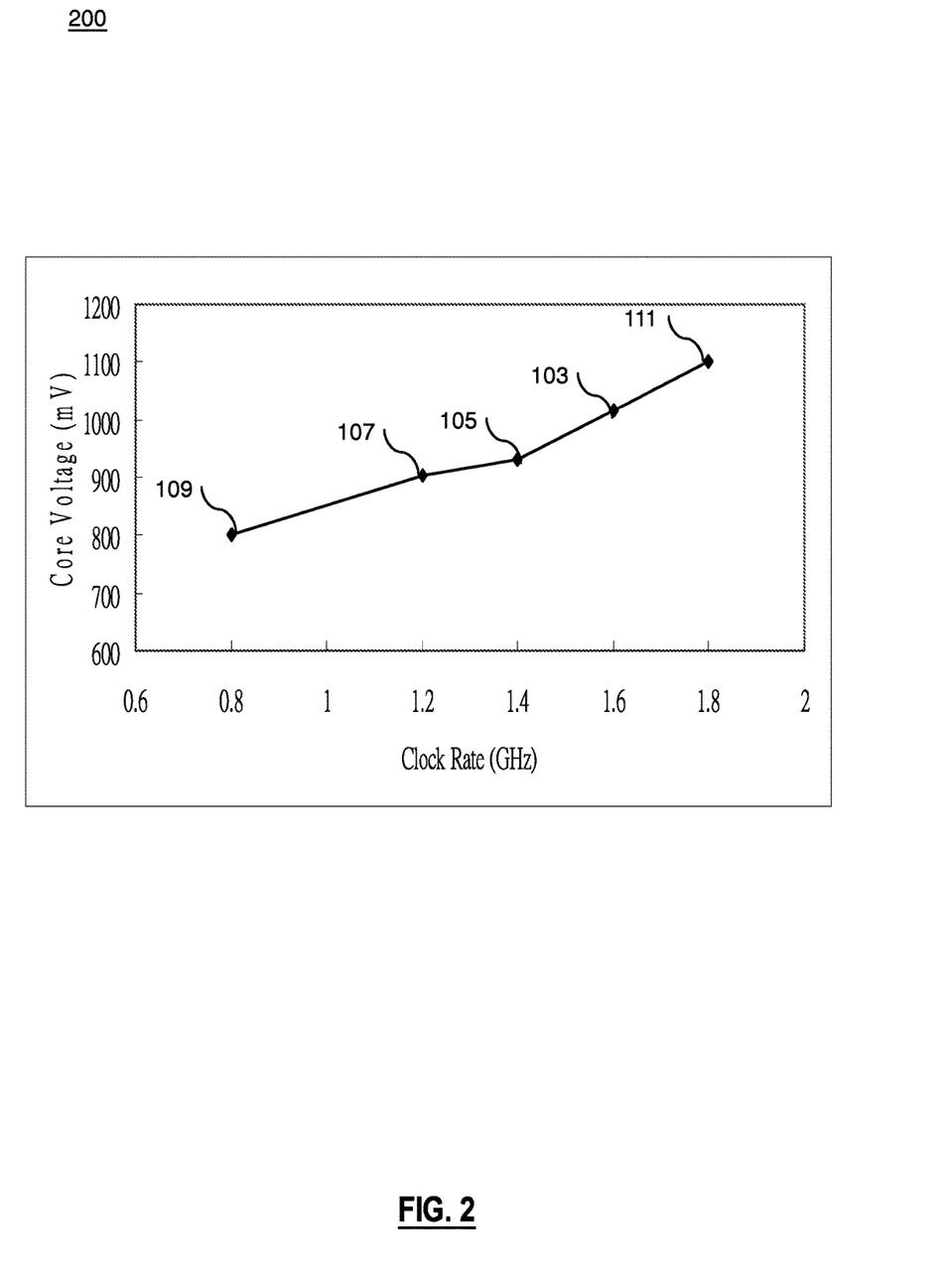
FIG. 2 is a scatter chart illustrating another set of operating points of a processor.

FIG. 2 is a scatter chart 200 illustrating another set of operating points of a processor arranged in accordance with at least some embodiments of the present disclosure. Unlike the four curves shown in the scatter chart 100, the points on the curve of FIG. 2 may correspond to multiple target operating constraints. For example, the same operating points 103, 105, 107, 109, and 111 of FIG. 1, which correspond to the operational environments that are associated with different target junction temperatures, are represented on the curve illustrated in FIG. 2. In other words, while still covering multiple target operating constraints, a reduced number of operating parameters and operating points may be stored.

Figure 3:
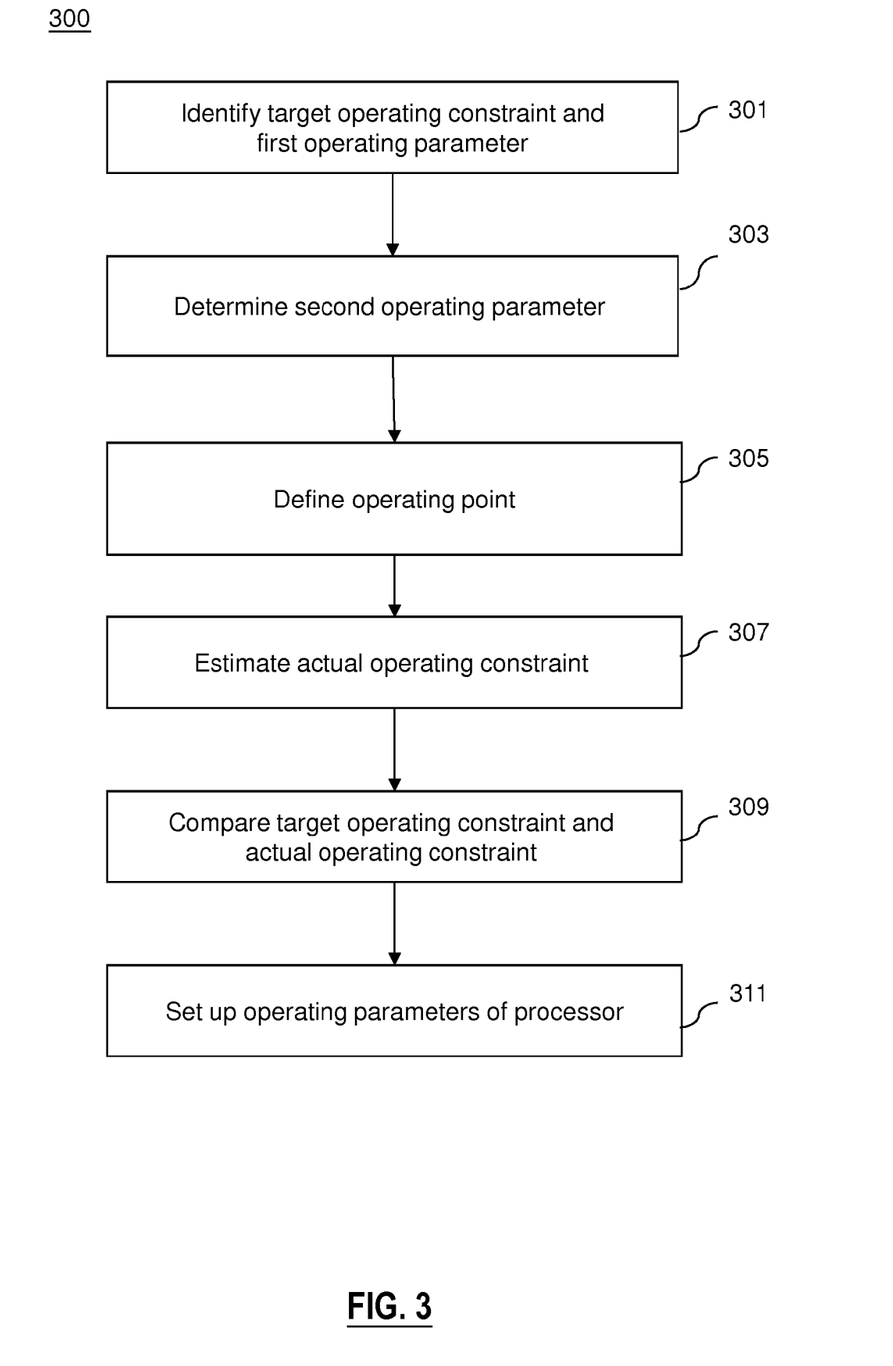
FIG. 3 is a flow chart of a method for managing power consumption of a processor.

FIG. 3 is a flowchart of a method 300 for managing power consumption of a processor, according to at least some embodiments of the present disclosure. Method 300 may include one or more operations, functions, or actions as illustrated by blocks 301, 303, 305, 307, and/or 309. The various blocks are not intended to be limiting to the described embodiments. For example, the operations identified in one or more blocks may be separated into additional blocks, while in other examples various operations may be combined together. In some other examples, one or more of the operations in the various blocks may be eliminated.

Processing for the method 300 may begin at block 301 (identify target operating constraint and first operating parameter), where the method 300 may be arranged to identify a target operating constraint and a first operating parameter. Processing may continue from block 301 to block 303. In block 303 (determine second operating parameter), a second operating parameter may be determined based on the identified target operating constraint and the identified first operating parameter. Processing may continue from block 303 to block 305 (define operating point), where process 300 may be arranged to define an operating point of the processor based on the identified target operating constraint, the identified first operating parameter, and the determined second operating parameter. Continuing from block 305 to block 307 (estimate actual operating constraint), where an actual operating constraint may be estimated through a measurement, a calculation, a look-up table, or some combination thereof. Processing may continue from block 307 to block 309 (compare target operating constraint and actual operating constraint), where the target operating constraint and the actual operating constraint are compared to each other. Continuing from block 309 to block 311 (set up operating parameters of processor), the operating parameters of the processor are set up based on the comparison and the operating point.

In block 301, a target operating constraint and a first operating parameter may be identified. The target operating constraint may not be a worst-case operating constraint. A worst-case operating constraint may generally refer to a predefined operating constraint used to characterize a worst-operating condition of a processor. A worst-case operating condition of a processor may refer to a condition in which all operating constraints are within a designed specification, but at the worst possible values. For example, a worst-case operating condition may be defined by the slowest acceptable transistor speed, maximum junction temperature of the processor, minimum actual voltage supplied to the processor, maximum acceptable ground noise, maximum acceptable clock jitter, and so on. In some implementations, the first operating parameter may include the core voltage of the processor, the clock rate of the processor, the clock multiplier for the processor, the sleep state cycle for the processor, the frequency of the repetition of the clock pulse, the width of the clock pulse, the power throttling for the processor, and so on.

In block 303, a second operating parameter may be determined based on the target operating constraint and the first operating parameter identified in block 301. In some implementations, the second operating parameters may include the core voltage of the processor, the clock rate of the processor, the clock multiplier for the processor, the sleep state cycle for the processor, the frequency of the repetition of the clock pulse, the width of the clock pulse, the power throttling for the processor, and so on. In block 305, the first operating parameter, the second operating parameter and the target operating constraint may be used to define an operating point. In some implementations, blocks 301, 303, and 305 are repeated to define a set of operating points.

In block 307, an actual operating constraint is estimated through a measurement or a calculation. The actual operating constraint may be an actual junction temperature of a processor at which the processor is operating. In block 309, the actual operating constraint is compared with the target operating constraint. In block 311, based on the comparison, the method 300 selects an appropriate operational profile for the processor. When appropriate, the processor operating in a first operational profile may be switched to operating in a second operational profile. As an illustration, suppose one of the operating points in the first operational profile corresponds to the clock rate of 1 GHz, the core voltage of 1V, the measured junction temperature of 40° C., and the ambient temperature of 30° C. The processor may determine that the clock rate will be increased by 40% to 1.4 GHz because of an anticipated resource-consuming task to be handled. In response to the increased clock rate, the processor may also determine that the core voltage is to be increased to 1.1V. In some implementations, the processor may change the clock rate through a clock multiplier based on a clock signal received from an external clock. The processor may also change the supplied core voltage through a power controller which controls an external power supply. The difference between the ambient temperature and the measured junction temperature, the target core voltage, and the target clock rate may be used to estimate a target junction temperature around 47° C. based on an identified model that defines an operational profile of the processor. If the target voltage, the target clock rate, and the target junction temperature match an operating point in the second operational profile, then the processor may be configured to issue a command to a power supply to adjust the operating voltage to 1.1V. If not, a higher voltage may be required to achieve and maintain the target clock rate of 1.4 GHz.

Figure 4:
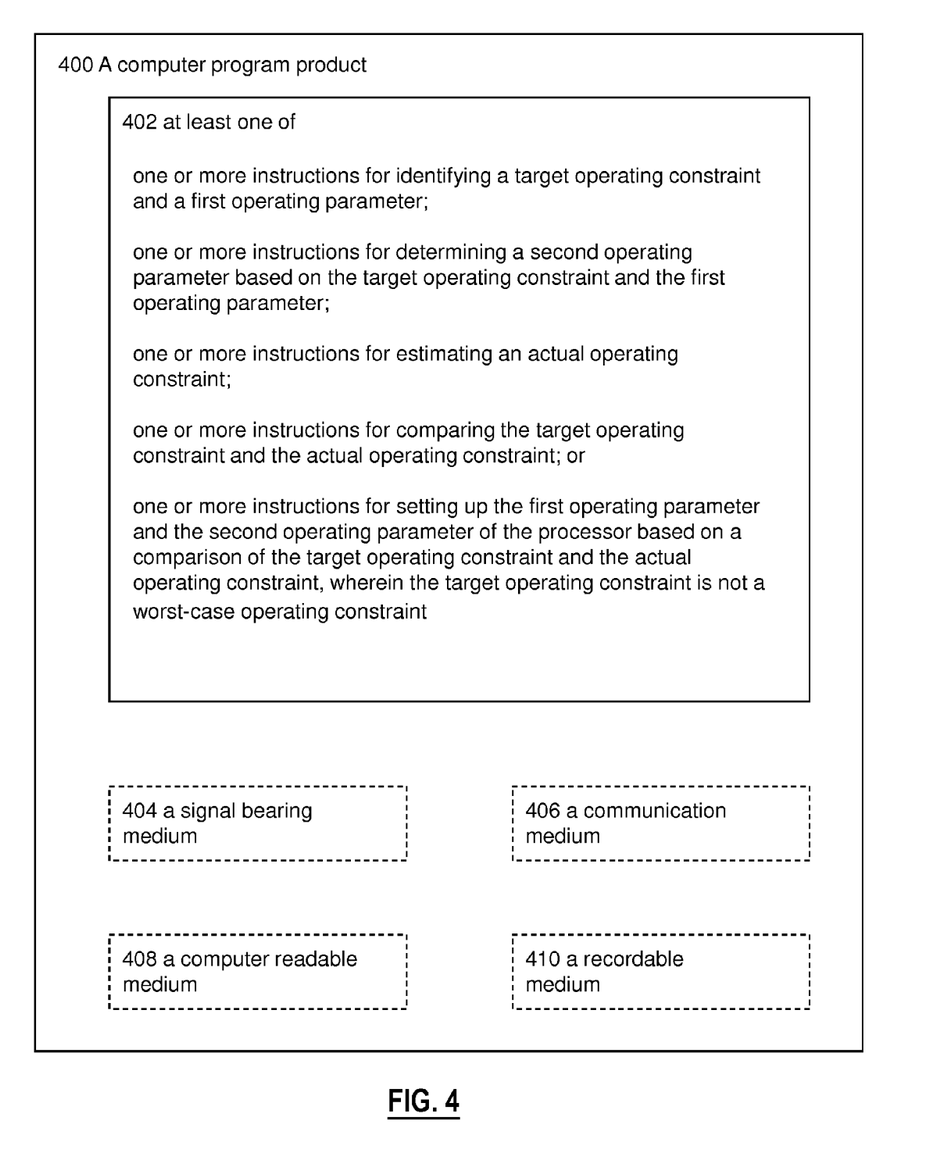
FIG. 4 is a block diagram illustrating a computer program product adapted to manage power consumption of a processor.

FIG. 4 is a block diagram illustrating a computer program product 400 for managing power consumption of a processor in accordance with at least some embodiments of the present disclosure. Computer program product 400 may include one or more sets of executable instructions 402 for executing the method described above and illustrated in FIG. 3. Computer program product 400 may be transmitted in a signal bearing medium 404 or another similar communication medium 406. Computer program product 400 may also be recorded in a computer readable medium 408 or another similar recordable medium 410.

Figure 5:
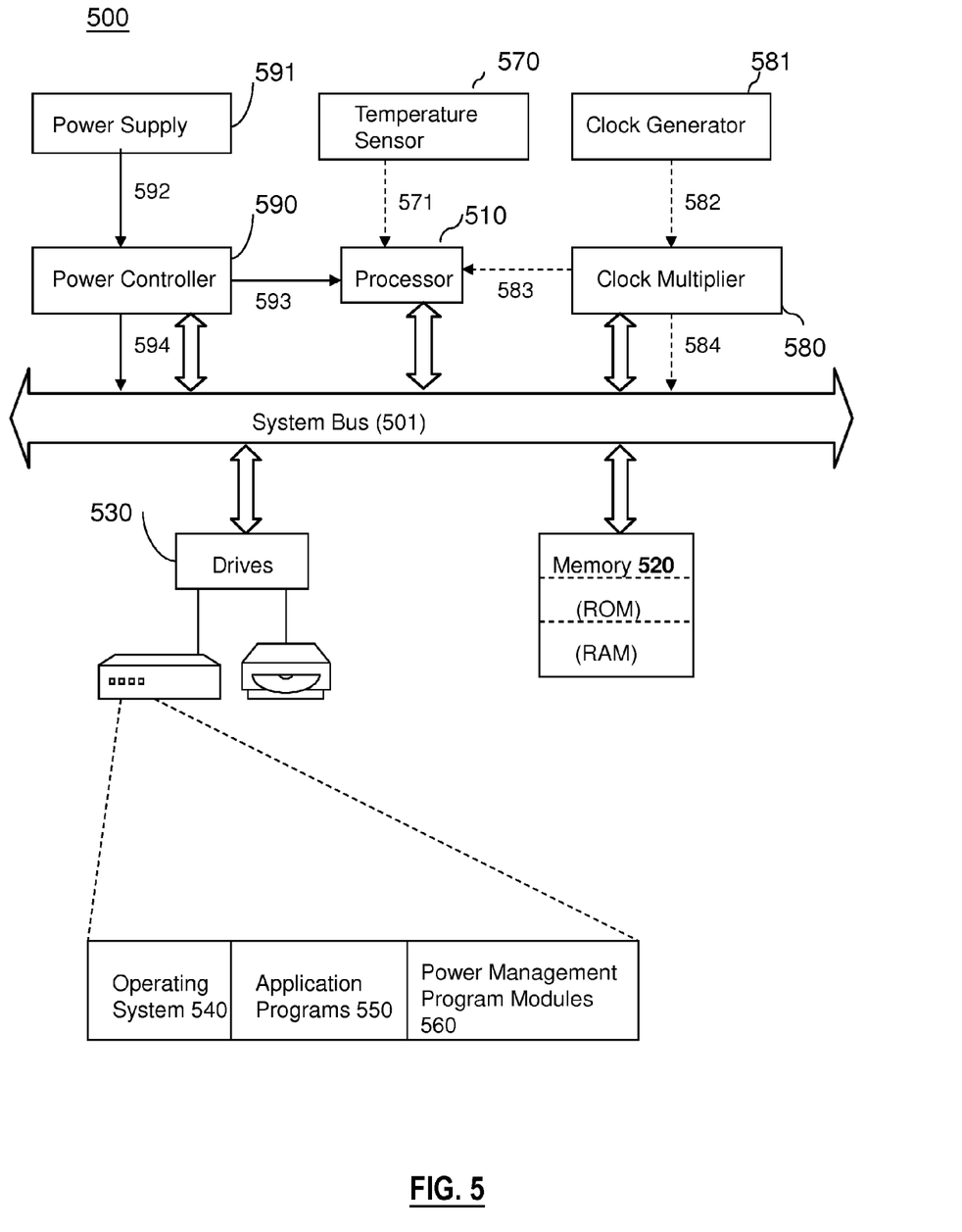
FIG. 5 is an example block diagram illustrating an example computing device that is arranged to manage power consumption of a processor, all arranged in accordance with at least some embodiments of the present disclosure.

FIG. 5 is an example block diagram illustrating an example computing device that is arranged to manage power consumption of a processor in accordance with at least some embodiments of the present disclosure. FIG. 5 illustrates a computer 500, including a processor 510, memory 520 and one or more drives 530. The drives 530 and their associated computer storage media, provide storage of computer readable instructions, data structures, program modules and other data for the computer 500. Drives 530 can include an operating system 540, application programs 550, program modules 560, and database 570.

The computer 500 may also include a temperature sensor 570 configured to detect the actual junction temperature of the processor 510. The computer 500 may further include a clock generator 581 which generates a reference clock signal 582. The reference clock signal 582 may be sent to a clock multiplier 580. The clock multiplier 580 may be configured to generate a second clock signal 583 at which the processor 510 is to be operated. The clock multiplier 580 may be configured to generate a third clock signal 584. The processor 510, the memory 520, and the drives 530 may be communicated with each other based on the third clock signal 584. In addition, the computer 500 may include a power controller 590 and a power supply 591. The power supply 591 may be configured to provide a system voltage 592 to the power controller 590. The power controller 590 may be configured to regulate the system voltage 592 and to generate a set of regulated voltages 593 and 594 to supply power to the processor 510 and other components (e.g., memory 520 and drives 530) of the computer 500, respectively. In some implementations, the clock multiplier 580 and the power controller 590 may be physically arranged in the processor 510.

In some implementations, the temperature sensor 570 may be configured to constantly detect an actual junction temperature of the processor 510 and to transmit a detected temperature signal 571 to the processor 510 so that the processor 510 may acknowledge an actual junction temperature detected by the temperature sensor 570. The processor 510 causes the detected actual junction temperature being saved into the memory 520. In addition, the processor 510 causes a power management program module 560 executed in the memory 520. The program module 560 performs steps of including, but not limited to, identifying a target operating constraint and a first operating parameter; determining a second operating parameter based on the target operating constraint and the first operating parameter; estimating an actual operating constraint; comparing the target operating constraint and the actual operating constraint; and setting up the first operating parameter and the second operating parameter of the processor based on a comparison of the target operating constraint and the actual operating constraint, wherein the target operating constraint is not a worst-case operating constraint.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link and/or channel, a wireless communication link and/or channel, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method to manage power consumption of a processor, the method comprising:
    identifying a worst-case operating condition of the processor, wherein the worst-case operating condition is defined by operating constraints that are within a designed specification of the processor and that include worst extremum values;
    identifying a first target operating constraint and a second target operating constraint, wherein the first target operating constraint and the second target operating constraint correspond to one of the operating constraints, and wherein none of the first target operating constraint and the second target operating constraint is at a worst extremum value of the one of the operating constraints;
    identifying a first operational profile based on the first target operating constraint, the second target operating constraint, or a combination thereof, wherein the identified first operational profile includes a first value of a first operating parameter and a first value of a second operating parameter;
    identifying a second operational profile, different from the identified first operational profile, based on the first target operating constraint, the second target operating constraint, or a combination thereof, wherein the identified second operational profile includes a second value of the first operating parameter and a second value of the second operating parameter;
    obtaining an estimate of an actual operating constraint; and
    controlling the processor to operate according to the identified first operational profile or the identified second operational profile based on a first comparison between the identified first target operating constraint and the estimate of the actual operating constraint, and based on a second comparison between the identified second target operating constraint and the estimate of the actual operating constraint,
    wherein controlling the processor to operate according to the identified second operational profile includes switching operation of the processor from the identified first operational profile to the identified second operational profile, and
    wherein switching the operation of the processor from the identified first operational profile to the identified second operational profile includes switching a value of the first operating parameter from the first value of the first operating parameter to the second value of the first operating parameter, and in response to the first operating parameter being stabilized at the second value of the first operating parameter, switching a value of the second operating parameter from the first value of the second operating parameter to the second value of the second operating parameter.

2. The method of claim 1, wherein obtaining the estimate comprises monitoring a task being processed or to be processed by the processor.

3. The method of claim 1, wherein obtaining the estimate comprises receiving a junction temperature of the processor detected by a temperature sensor arranged adjacent to the processor.

4. The method of claim 1, wherein the first target operating constraint is greater than the second target operating constraint.

5. The method of claim 4, wherein controlling the processor to operate according to the identified second operational profile includes controlling the processor to operate according to the identified second operational profile in response to the first comparison indicating that the estimate of the actual operating constraint is less than the identified first target operating constraint, and in response to the second comparison indicating that the estimate of the actual operating constraint is less than the identified second target operating constraint.

6. The method of claim 4, wherein controlling the processor to operate according to the identified first operational profile includes controlling the processor to operate according to the identified first operational profile in response to the first comparison indicating that the estimate of the actual operating constraint is less than the identified first target operating constraint, and in response to the second comparison indicating that the estimate of the actual operating constraint is greater than the identified second target operating constraint.

7. A computer device in which power consumption of a processor is managed, the computer device comprising:
    the processor configured to operate according to a first operational profile or a second operational profile that is different from the first operational profile; and
    a sensor coupled to the processor and configured to provide an estimate of an actual operating constraint of the processor, wherein:
        the first operational profile and the second operational profile are based on a first target operating constraint a second target operating constraint, or a combination thereof,
        the first operational profile includes a first value of a first operating parameter and a first value of a second operating parameter,
        the second operational profile includes a second value of the first operating parameter and a second value of the second operating parameter,
        the first target operating constraint and the second operating constraint correspond to one of operating constraints which define a worst-case operating condition of the processor, and the operating constraints include worst extremum values but within a designed specification of the processor, wherein none of the first target operating constraint and the second operating constraint is at a worst extremum value of the one of operating constraints, and
        the processor is configured to operate according to the first operational profile or the second operational profile based on a first comparison between the first target operating constraint and the estimate of the actual operating constraint, and based on a second comparison between the second operating constraint and the estimate of the actual operating constraint, wherein to operate according to the second operational profile, the processor is configured to switch operation of the processor from the first operational profile to the second operational profile, and wherein to switch the operation of the processor from the first operational profile to the second operational profile, the processor is configured to switch a value of the first operating parameter from the first value of the first operating parameter to the second value of the first operating parameter, and in response to the first operating parameter being stabilized at the second value of the first operating parameter, switch a value of the second operating parameter from the first value of the second operating parameter to the second value of the second operating parameter.

8. The computer device of claim 7, wherein the worst-case operating condition includes a maximum possible junction temperature of the processor specified in the designed specification of the processor.

9. The computer device of claim 7, wherein the actual operating constraint includes an actual junction temperature of the processor.

10. The computer device of claim 7, further comprising a module coupled to the processor and configured to monitor a task being processed or to be processed by the processor.

11. The computer device of claim 7, further comprising a memory coupled to the processor and the sensor, wherein the memory is configured to store a plurality of operating points defined by the first operational profile based on the first operating parameter and the second operating parameter.

12. The computer device of claim 7, wherein the sensor includes a temperature sensor arranged adjacent to the processor, and wherein the temperature sensor is configured to detect an actual junction temperature of the processor.

13. The computer device of claim 7, further comprising a clock multiplier arranged adjacent to the processor and configured to generate a clock signal.

14. The computer device of claim 7, further comprising a power controller arranged adjacent to the processor and configured to control a core voltage of the processor.

15. The computer device of claim 7, further comprising a memory coupled to the processor and configured to store the first operational profile and the second operational profile.

16. The computer device of claim 7, wherein the processor is configured to maintain the operation of the processor according to the second operational profile in response to the first comparison indicative of the estimate of the actual operating constraint being less than the first target operating constraint, and in response to the second comparison indicative of the estimate of the actual operating constraint being less than the second target operating constraint.

17. The computer device of claim 7, wherein the processor is configured to maintain the operation of the processor according to the first operational profile in response to the first comparison indicative of the estimate of the actual operating constraint being less than the first target operating constraint, and in response to the second comparison indicative of the estimate of the actual operating constraint being greater than the second target operating constraint.

18. A method to manage power consumption of a processor, the method comprising:

identifying a worst-case operating condition of the processor, wherein the worst-case operating condition is defined by operating constraints that are within a designed specification of the processor and that include worst extremum values;

identifying a first target operating constraint at which a first operating parameter has a first value;

determining a second operating parameter that has a second value based on the first target operating constraint and the first value of the first operating parameter;

obtaining an estimate of an actual operating constraint from operating the processor at a first operating point defined by the first target operating constraint, such that when the processor is operated at the first operating point, the first operating parameter has the first value, and the second operating parameter has the second value;

comparing the first target operating constraint and the estimate of the actual operating constraint;

determining whether to modify the first value of the first operating parameter and/or the second value of the second operating parameter based on a result of the comparison between the first target operating constraint and the estimate of the actual operating constraint, wherein the first target operating constraint corresponds to one of the operating constraints and is not at a worst extremum value of the one of the operating constraints;

identifying a second target operating constraint, wherein the second target operating constraint corresponds to the one of the operating constraints and is not at the worst extremum value of the one of the operating constraint;

identifying a second operating point according to the second target operating constraint, wherein the first operating parameter has a third value;

determining a fourth value of the second operating parameter based on the second operating constraint and the third value of the first operating parameter;

comparing the second target operating constraint and the estimate of the actual operating constraint; and controlling the processor to switch operation of the processor to the second operating point in response to the estimate of the actual operating constraint being less than the first operating constraint and the second operating constraint, wherein controlling the processor to switch the operation of the processor to the second operating point includes switching a value of the first operating parameter from the first value to the third value, and in response to the first operating parameter being stabilized at the third value, switching a value of the second operating parameter from the second value to the fourth value.

19. The method of claim 18, further comprising controlling the processor to switch operation of the processor to the first operating point in response to the estimate of the actual operating constraint being less than the first operating constraint and greater than the second operating constraint.

* * * * *